United States Patent Office.

WILLIAM M. NORRIS, OF PRINCETON, NEW JERSEY.

BATING.

SPECIFICATION forming part of Letters Patent No. 365,017, dated June 14, 1887.

Application filed January 3, 1887. Serial No. 223,297. (No specimens.)

*To all whom it may concern:*

Be it known that I, WILLIAM M. NORRIS, a citizen of the United States, residing at Princeton, in the county of Mercer and State of New Jersey, have invented a new and useful Process for Treating Hides or Skins Preparatory to Tanning, and known as "Bating;" and I do hereby declare that the following is a full, clear, and exact description of the invention, which will enable others skilled in the art to which it appertains to make and use the same.

Heretofore manure has been almost universally used for this purpose. It is objectionable, not alone on account of its very offensive odor, but its liability to ferment in warm weather and thus cause much damage to the stock.

Lime is almost universally used to unhair hides or skins.

The object of my invention is to remove the lime and soften the hides or skins and open the pores, so that the salts of lime, fine hairs, dirt, and other non-tannable substances work out freely on the beam and leave the stock of proper weight and consistence, thoroughly cleansed, and in perfect condition for tanning. This I accomplish by bringing together in proper proportions sulphureted hydrogen gas, sulphur, sugar, and water in the manner described below. The hides or skins, after being unhaired with lime in the usual way, are thrown into the bate-vat with about seven hundred gallons of warm water. To this is added one pound of sugar, one pound powdered sulphur, and the hides or skins are then stirred about for a few moments. Then, in any suitable apparatus for the development of sulphureted hydrogen gas, placed in convenient proximity to the bate-vat, two pounds of sulphide of iron, (FeS,) two quarts of water, and one-fourth pound of sulphuric acid ($H_2SO_4$) are placed. The sulphureted hydrogen gas ($H_2S$) will at once be given off. It is led from the apparatus by means of a glass tube and passed through water to free it from impurities, and finally into the above described bate-vat, when the following molecular changes will occur: The sulphureted hydrogen gas will unite with the lime in the hides or skins and form sulphide of lime. This sulphide of lime will combine with the sulphur present and form one of the higher or poly-sulphides of lime, which will in turn take up more lime and be reduced to the sulphide, and so on. In the course of an hour or so the sulphureted hydrogen gas will cease to be developed. Then run off the liquor from the hides or skins in the bate-vat and wash thoroughly several times with fresh water. Then remove the hides or skins from the vat and work on the beam in the usual way.

For a "pack" of hides or skins—that is, fifty to seventy pounds hides, one hundred and fifty calf-skins, or thirty dozen sheep or goat skins—I prefer to use seven hundred gallons water, one pound sugar, one pound powdered sulphur, and the sulphureted hydrogen gas that is developed from two pounds of sulphide of iron (FeS) by one-fourth pound sulphuric acid, ($H_2SO_4$;) but I do not confine myself to the above proportions.

The whole process of bating a skin or hide, as above described, may be performed in two hours; or the hides or skins may remain in the resultant liquor after the operation is complete as long as is convenient for the tanner without injury.

Instead of sugar, I may use sirup, glucose, or substances of like nature,

Having fully described my invention, what I desire to claim and secure by Letters Patent is—

The process of bating hides or skins by means of sulphureted hydrogen gas led into a bate-vat in which are placed sulphur, sugar, water, and the hides or skins, substantially as described.

WILLIAM M. NORRIS.

Witnesses:
   HELEN G. NORRIS,
   MARIA S. NORRIS.